March 27, 1962   N. A. PICCIONE   3,027,131
SAFETY SHOCK ABSORBING YIELDING SEAT
Filed July 13, 1960
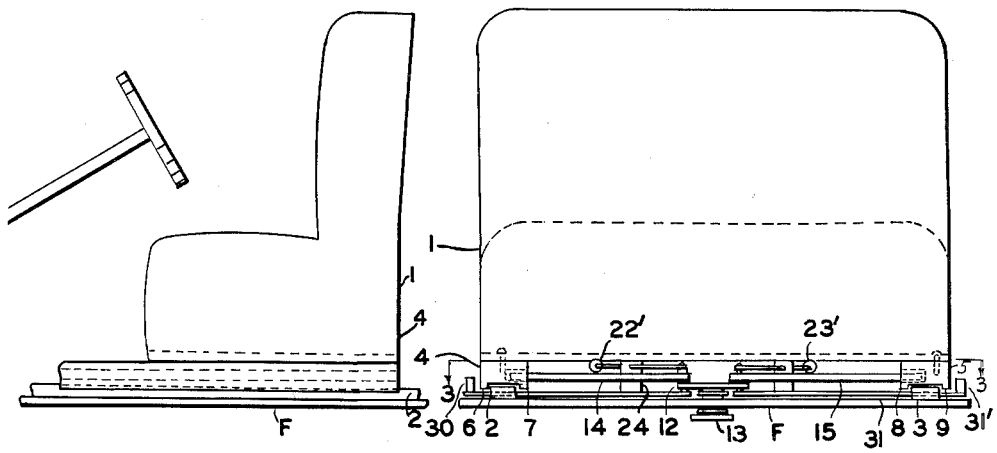
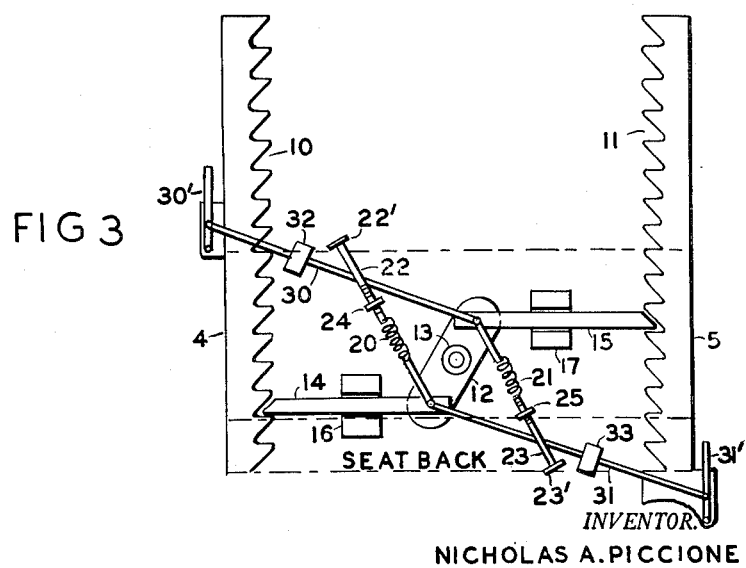
INVENTOR.
NICHOLAS A. PICCIONE 3,027,131
SAFETY SHOCK ABSORBING YIELDING SEAT
Nicholas A. Piccione, 95 Clearstream Ave.,
Valley Stream, N.Y.
Filed July 13, 1960, Ser. No. 42,569
2 Claims. (Cl. 248—429)

This invention relates to safety seats for vehicles and more particularly to such means for preventing a driver being pinned against a steering wheel.

One of the major hazards in serious accidents is the fact that the driver is frequently crushed and pinned by the steering wheel against the front seat. In such cases the driver is either seriously injured by the steering wheel or possibly is unable to be removed without major cutting apart of the car. In such cases the delay in removing the driver from such a situation is frequently the difference between life and death.

The present invention provides a vehicle seat which is adapted to move back on a pair of rails upon the application of a predetermined force in the backward direction on the seat. The device is adjustably spring loaded for a predetermined force required to move the seat.

More particularly the seat is mounted on a pair of side rails attached to the frame of the vehicle and the seat is mounted on a pair of sliding members mounted on the vehicle rails. The sliding members have ratchet-like teeth. A locking device is mounted under the seat and connected to the frame of the vehicle, the locking device being adapted to lock the teeth but to yield so that the seat may move backwards upon the application of a predetermined force. The locking means are adjustably spring loaded and emergency releasing means are provided both at the front and the rear of the seat so that in the event of an accident they may be easily released from any direction.

In the event of a rear end collision the force of the driver's body will be applied against the rear of the front seat and the front seat will yield, thereby minimizing the effect of the so-called whiplash neck injuries which constitute a majority of the injuries today.

In the event of a front end collision the front seat will not move forward so that if the driver does not have a safety belt he will undoubtedly strike the steering wheel. However, he will then rebound back into the seat which will yield and prevent him from being pinned by the steering wheel or the front dashboard or even the motor of the car.

Accordingly a principal object of the invention is to provide new and improved safety seats for vehicles.

Another object of the invention is to provide new and improved safety seats for vehicles for preventing the occupant from being pinned against the seat.

Another object of the invention is to provide new and improved safety seats which are adapted to yield towards the rear of the vehicle upon the application of a predetermined force.

Another object of the invention is to provide new and improved safety seats which are adapted to yield upon the application of force and which are adjustable.

Another object of the invention is to provide new and improved safety locking means for vehicle seats which may also be used to adjust the position of the seats.

These and other objects of the invention will be apparent from the following specification and drawings, of which FIGURE 1 is a side view of an embodiment of the invention.

FIGURE 2 is a back view of the embodiment of FIGURE 1.

FIGURE 3 is a detailed sectional view taken along the lines 3—3 of FIG. 2.

Referring to the figures the seat 1 is adapted to be mounted on two rails 2 and 3 which are connected to the frame F of the vehicle. The rails 2 and 3 are parallel to each other and the sides of the vehicle. The seat is mounted to the rails by a pair of support members 4 and 5 fixedly connected to the seat and which are slidably mounted on the rails 2 and 3 preferably with roller bearings and which have overlapping lips 6, 7, 8 and 9 which position the seat on the rails 2 and 3. The support members 4 and 5 each have a rack of ratchet-like teeth 10 and 11 which are adapted to be engaged by locking means so that the seat will yield toward the rearward direction only.

The locking means comprises connecting rod 12 which is pivotally mounted to the frame on the shaft 13. A pair of arms 14 and 15 are pivotally mounted on the ends of the connecting rod 12. These arms are constrained to a horizontal motion perpendicular to the axis of the toothed members 4 and 5 by means of the guides 16, 17, connected to the frame F. The ends of the arms 14 and 15 fit into the ratchet-like teeth, the ends of the arms being straight on one side and sloping on the other to fit into the corresponding configuration of the teeth. The teeth are angled in the direction to permit yielding of the arms 14 and 15 and motion of the seat in a rearward direction only.

The arms 14 and 15 are adjustably spring loaded by means of the springs 20 and 21 which are connected to the ends of the connecting rod 12 at one end to adjustment rods 22 and 23 at the other end. The adjustment rods are threaded into brackets 24, 25 connected to the frame and suitable handles 22' and 23' are provided so that the adjustment rods may be screwed relative the brackets to change the spring force on the locking arms. Releasing rods 30 and 31 having operating handles or levers 30', 31' are connected to the ends of the connecting rod 12 and are slidably mounted in the guides 32, 33 connected to the frame of the vehicle. The purpose of having two releasing handles is to have them accessible from either the front or the rear of the seat as sometimes the front door may be jammed.

The seats may be adjusted in position by levers 30', 31' in the same manner as conventional seats by releasing the spring pressure and moving the seat to a desired position. The spring loading of the locking arms may be adjusted by means of the handles 22', 23'. If desirable one of the springs may be omitted provided the other spring is made sufficiently strong since one spring would act through the connecting rod to locate both locking arms.

In the event that the vehicle is hit in the rear the occupant is normally snapped back against the back of the seat. However, with the present device the seat will yield in the backward direction upon the application of a predetermined force which is adjustable. This yielding will minimize or prevent the so-called whiplash neck injuries which are caused by snapping of the head back while the body is constrained against the back of the seat.

Also, in the event of a front end collision the seat will yield upon pressure of the steering wheel against the body of the driver. In many such accidents the steering wheel causes serious injuries to the driver and quite frequently pins the driver against the front seat so that he is either seriously injured or impaled or cannot be removed quickly and efficiently enough for necessary first aid. Also, at times there is danger of fire due to spilled gasoline while an occupant is pinned in the car. In some cases the frame of the car is so badly twisted that the dashboard and even the motor are pushed back sufficiently far to injure the driver. The present seat would yield before any such contingency.

In the event it is desired to move the seat further it may be easily done by pulling one of the release rods 30, 31. There are two release rods so that they may be available from either the front or the rear of the seat.

Many modifications may be made by those who desire to practice the invention without departing from the scope thereof which is defined by the following claims.

I claim:
1. Safety seat means for vehicles comprising a pair of parallel rails attached to the frame of a vehicle adjacent and parallel the sides thereof, a vehicle seat, a pair of mounting members fixedly connected to said seat and slidably mounted on said rails for movement along said rails, said mounting members each having a rack of ratchet like teeth adapted to permit movement of said seat in one direction, and adjustably yieldable shock absorbing holding means adapted to fit into said ratchet like teeth, means to adjustably spring load said holding means into holding contact with said teeth, said ratchet teeth and holding means being shaped to permit adjustable movement of said seat only in one direction upon the application of a predetermined force, and means for adjusting the position of said seat comprising releasing means connected to said holding means.

2. A safety seat for vehicles adapted to prevent a person from being pinned by a steering wheel comprising a pair of parallel rails attached to the frame of a vehicle adjacent and parallel the sides thereof, a vehicle seat, a pair of mounting members fixedly connected to said seat and slidably mounted on said rails for movement along said rails, said mounting members each having a rack of ratchet like teeth adapted to permit movement of said seat rearwardly, and adjustably yieldable shock absorbing holding means comprising a connecting rod member pivotally mounted to the frame of said vehicle adjacent the center line between said rails, a pair of holding arms each pivotally connected to one end of said connecting rod and mounted for motion perpendicular to said rack mounting means, the ends of said arms being adapted to fit into said ratchet like teeth, means to adjustably spring load said arms into holding contact with said teeth, said ratchet teeth and arms being shaped to permit movement of said seat rearwardly upon the application of the predetermined force, and means to adjust the position of said seat comprising manual means to release said spring loaded arms.

References Cited in the file of this patent

UNITED STATES PATENTS

| 1,700,835 | Farmer | Feb. 5, 1929 |
| 1,812,256 | Camp | June 30, 1931 |
| 2,179,085 | De Rose | Nov. 7, 1939 |
| 2,639,913 | Reynolds | May 26, 1953 |
| 2,932,342 | Simons | Apr. 12, 1960 |

FOREIGN PATENTS

| 24,876 | Great Britain | 1901 |
| 327,747 | Great Britain | Apr. 10, 1930 |
| 508,436 | Italy | Jan. 7, 1955 |